United States Patent [19]

Traver

[11] Patent Number: 4,888,384
[45] Date of Patent: Dec. 19, 1989

[54] STABLE, TWO PACKAGE WATER EMULSIONS OF SILICONE HYDRIDE FLUIDS

[75] Inventor: Frank J. Traver, Troy, N.Y.

[73] Assignee: General Electric Company, Waterford, N.Y.

[21] Appl. No.: 111,390

[22] Filed: Oct. 21, 1987

[51] Int. Cl.⁴ ............ C08L 83/07; C08L 83/05; C08L 83/06
[52] U.S. Cl. .................. 524/862; 528/15; 528/31; 528/32
[58] Field of Search ......... 106/287.15, 287.14; 252/312; 528/478, 31, 32; 524/863, 862

[56] References Cited

U.S. PATENT DOCUMENTS

| | | | |
|---|---|---|---|
| 3,900,617 | 8/1975 | Grenoble | 427/387 |
| 4,190,688 | 2/1980 | Traver et al. | 427/391 |
| 4,436,856 | 3/1984 | Huhn et al. | 524/211 |
| 4,613,630 | 9/1986 | Bauman et al. | 521/134 |
| 4,624,900 | 11/1986 | Fau | 428/447 |
| 4,743,670 | 5/1988 | Yoshida et al. | 528/15 |

Primary Examiner—John F. Terapane
Assistant Examiner—Daniel Metzmaier
Attorney, Agent, or Firm—John W. Harbour

[57] ABSTRACT

An emulsion where water is a continuous phase and having a discontinuous oil phase comprising:
(a) silicone hydrides containing units of the formula:

$$R_a H_b SiO_{(4-a-b)/2}$$

where a may be 0, 1, or 2; b may be 1 or 2; a+b may be 1, 2, or 3; R is a substituted or unsubstituted hydrocarbon radical of 1 to 12 carbon atoms; and
(b) hydroxy substituted silicone containing units of the formula:

$$R_c(OH)_d SiO_{(4-c-d)/2}$$

wherein c is 1, 2, or 3; d is 1 or 2; c+d may be 2, 3, or 4; and R is a substituted or unsubstituted hydrocarbon radical of from 1 to 12 carbon atoms.

1 Claim, No Drawings

STABLE, TWO PACKAGE WATER EMULSIONS OF SILICONE HYDRIDE FLUIDS

The present invention relates to stable water emulsions of silicone hydride fluids. More particularly, the present invention relates to the use of hydroxy substituted silicone fluids to stabilize silicone hydride fluid emulsions in water.

BACKGROUND OF THE INVENTION

Organic solvent born silicone adhesives, silicone release coatings, and silicone paints, etc. have been in use for a number of years. Growing concern over the release of these organic solvents into the atmosphere and over worker safety upon exposure to the solvents when applying the above products has prompted both industry and government to restrict their use and solvent content. Thus, there is growing pressure to remove organic solvents from many silicone products.

A preferred course for removing the organic solvents is to replace the solvent with a water emulsion of silicone. However, as with most apparently simple solutions there are several problems which arise upon using silicone emulsions in water. Not the least of these problems is that a silicone hydride, i.e. a compound having Si—H groups is unstable in water and will react to form Si—OH and hydrogen gas. Silicone hydrides are a key component to crosslink and cure vinyl addition cured silicone compositions which is the base of many of the above mentioned products.

Thus, silicone adhesives, silicone release coatings and silicone paints which are blended from vinyl addition cured silicone compositions cannot be practically applied from water emulsions. Such water emulsions will gas, making even short term storage in drums, pails and other standard containers unwise and unsafe.

It is an object of the present invention to stabilize silicone hydrides in water emulsion.

It is another object of the present invention to make a stable emulsion of silicone hydride in water which may be combined with a water emulsion of vinyl silicone and catalyst to form a curable silicone emulsion in water.

These and other objects of the present invention are accomplished by means of the disclosure set forth hereinbelow.

SUMMARY OF THE INVENTION

Briefly there is provided by the present invention an emulsion where water is a continuous phase and having a discontinuous oil phase comprising:

(a) silicone hydrides containing units of the formula:

$$R_a H_b SiO_{(4-a-b)/2}$$

where a may be 0, 1 or 2; b may be 1 or 2; a+b may be 1, 2 or 3; R is a substituted or unsubstituted hydrocarbon radical of 1 to 12 carbon atoms; and (b) hydroxy substituted silicone containing units of the formula:

$$R_c(OH)_d SiO_{(4-c-d)/2}$$

wherein c is 1, 2 or 3; d is 1 or 2; c+d may be 2, 3 or 4; and R is a substituted or unsubstituted hydrocarbon radical of from 1 to 12 carbon atoms.

Optionally there may be included emulsifying agents, silicone diluents for the silicone hydride, wetting agents, and biostats.

DETAILED DESCRIPTION OF THE INVENTION

The continuous water phase should be of distilled or dionized water. It is important to reduce hydrogen gas formation that the water have a substantially neutral pH.

Silicone hydrides for use herein may be any of the silicone hydrides known for use in vinyl addition reactions of the prior art. Such silicone hydrides contain at least one unit having the formula:

$$R_a H_b SiO_{(4-a-b)/2}$$

with the remaining siloxane units having the formula:

$$R_n SiO_{(4-n)/2}$$

where R is a substituted or unsubstituted hydrocarbon radical of from about 1 to about 12 carbon atoms; a is 0, 1 or 2; b is 1 or 2; a+b is 1, 2 or 3; and n has a value of 0, 1, 2 or 3. Empirically the silicone hydride has the general formula:

$$R_A H_B SiO_{(4-A-B)/2}$$

where A has an average value of from 0.5 to 2; B has an average value of from 0.005 to 2.0; A+B is equal to from 1 to 3; and R is given above. Hydrogen weight content generally varies between about 0.005 and 2% by weight hydrogen. The silicone hydride may be a resin or a fluid as appropriate to the intended application. Within the scope of the above formulas the resin or fluid may contain hydrogen siloxane units, $HSiO_{1.5}$, methyl hydrogen siloxane units, $HSiCH_3O$, dimethyl hydrogen siloxane units, $HSi(CH_3)_2O_{\frac{1}{2}}$, and dihydrogen siloxane unts, $H_2SiO$.

U.S. Pat. No. 4,071,644 discloses silicone hydrides utilized in release coatings. U.S. Pat. No. 3,884,866 discloses silicone hydrides as used in siloxane elastomers. U.S. Pat. No. 3,197,433 discloses cyclic silicone hydrides. U.S. Pat. No. 3,304,259 discloses silicone hydrides as used in greases. U.S. Pat. No. 3,527,655 discloses silicone hydrides as used in adhesive rubber. U.S. Pat. No. 3,159,662 discloses silicone hydrides of general interest. All of such silicone hydrides are suitable for use herein. All of the above patents are hereby incorporated by reference.

The amount of silicone hydride present in the emulsion as well as the hydride content desired must be determined based upon intended use. Obviously there must not be so much silicone hydride with other constituents of the oil phase that the emulsion inverts. Likewise the emulsion should contain a sufficient oil phase including silicone hydride that it is useful. Generally to maintain a stable and useful emulsion there should be a weight ratio of oil phase to water phase ranging from about 1/20 to about 4/1 and preferably from about 1/10 to about 3/1. The silicone phase may be entirely the silicone hydride and hydroxy substituted silicone fluid described below or preferably it will contain such useful and necessary additives as discussed further.

Hydroxy substituted silicone useful herein contain units of the general formula:

$$R_c(OH)_dSiO_{(4-c-d)/2}$$

with the remaining siloxane units having the formula:

$$R_nSiO_{(4-n)/2}$$

wherein c is 1, 2 or 3; d is 1 or 2; c+d may be 2, 3 or 4; n has a value of 0, 1, 2 or 3; and R is a substituted or unsubstituted hydrocarbon radical of from 1 to about 12 carbon atoms. The hydroxy substituted silicone is preferably a fluid having a viscosity ranging from about 5 to about 10,000 centipoise at 25° C. and have a hydroxy content of from about 0.1 to about 20% by weight. Preferably the hydroxy substituted fluid should have a viscosity of from about 10 to about 500 centipoise at 25° C. and a hydroxy content of from about 0.5 to 15% by weight. Within the above formula the hydroxy groups may take the form of $CH_3(OH)SiO_{2/2}$, $(CH_3)_2(OH)SiO_{\frac{1}{2}}$, $(OH)_2SiO_{2/2}$ combined with art known M, D, T and Q units.

Preferred hydroxy substituted silicone fluids are linear silanol stopped polydiorganosiloxanes of the formula:

$$HO-R_2SiO-_yH$$

where R is defined and y is 1 to about 200.

In the oil phase, with the silicone hydride, there must be sufficient hydroxy substituted silicone fluid that gas generation is inhibited. This amount will depend on several factors including hydride content and hydroxy functionality of the fluid. To inhibit gas generation there should be added from at least about 1 part by weight hydroxy functions for each 3 parts by weight of hydride function. Preferably the minimum such ratio should be about ⅔ by weight hydroxy functions to hydride functions.

The maximum amount of hydroxy function should not be grossly in excess of the amount necessary to inhibit gas generation. At some point an excessive number of hydroxy functions will compete with vinyl groups or other reactive material for the hydride functions during use of the emulsion. Also residual hydroxy compound will change the character of the cured material. Thus, it is preferred that the maximum amount by weight of hydroxy functions to hydride functions not exceed about 17/1 by weight or about 1/1 on a molar basis. Preferably the weight ratio should not exceed about 10/1.

R as discussed herein is a substituted or unsubstituted hydrocarbon of from 1 to about 12 carbon atoms. Radicals represented by R include alkyl radicals (e.g., methyl, ethyl, propyl, isopropyl, butyl, octyl, etc., radicals); cycloalkyl radicals (e.g., cyclopentyl, cyclohexyl, cycloheptyl, etc. radicals); aryl radicals (e.g., phenyl, napththyl, tolyl, xylyl, etc. radicals); aralkyl radicals (e.g., benzyl, phenylethyl, phenylpropyl, etc. radicals); halogenated derivatives of the above radicals, including chloromethyl, trifluoromethyl, chloropropyl, chlorophenyl, dibromophenyl, tetrachlorophenyl, difluorophenyl, etc. radicals; alkenyl radical, e.g., vinyl, allyl, methally, butenyl, etc.; and cyanoalkyl radicals, e.g., beta-cyanoethyl, gamma-cyanopropyl, beta-cyanopropyl, etc. radicals. Preferably, at least 75% of the R groups attached to silicon in the polysiloxanes herein are methyl radicals. Where sufficient R contains, for example, a carboxy group, sulfonyl group, or is substituted with an emulsifying agent, the silicone may be self emulsifying.

An emulsifying agent is generally necessary to create and maintain the oil in water emulsion at higher ratios of oil to water. Persons skilled in the art of emulsions readily understand the use and effectiveness of different emulsifying agents and those that are most useful in silicone emulsions in water. Common silicone emulsions presently in use include greases, lotions and liquids. The science of surface phenomena is not an exact one, and thus stable emulsifying agents cannot be taught with precision. Generally emulsifiers include nonionic emulsifiers such as alkylphenoxy, polyoxyalkylene glycols, polyoxyalkylene sorbitan monooleate and sorbitan stearates; cationic emulsifiers such as polyethoxylated quaternary ammonium salts and polyethoxylated quaternary ammonium chloride; and anionic emulsifiers such as sodium salts of alkylaryl polyether sulfonate. This list is not exhaustive of emulsifying agents presently employed for silicones.

Generally the emulsifier is added at a ratio to oil phase ranging from about 1/100 to about 1/5. Preferred amounts of emulsifier differ with the particular composition.

The silicone hydride may be mixed with a silicone diluent where desired. The effect of the silicone diluent may be to assist mass transfer upon use, to make preparations of mixing emulsions less sensitive to slight variation or to stabilize the emulsion of silicone hydride which is generally difficult to stabilize.

The skilled artisan can well imagine that a micelle of silicone hydride which contacts a micelle of vinyl silicone and platinum will begin to react at the interface. Generally mass transfer is not a problem because both micelles are of sufficiently low viscosity and have sufficient miscibility to readily mix. However, without thorough mixing micelles of silicone which do not have these properties will not properly cure. The amount of mixing necessary can be reduced or eliminated where the silicone hydride has been premixed with a substantial portion of the silicone compound with which it is to react. In the absence of the platinum catalyst a vinyl functional silicone is inert to the silicone hydride. Thus, it would be advantageous to use vinyl functional silicone as a diluent with the silicone hydride where the silicone hydride is to undergo an addition reaction. Of course, the diluent can be any material that will aid mass transfer including low viscosity linear and cyclic silicone fluids.

To overcome mass transfer hinderances between micelles is not the principal reason for adding a silicone diluent. Silicone hydride emulsions in water are more difficult to stabilize than emulsions of silicones having, for example, vinyl groups, amine groups, mercaptan groups, etc. Thus a silicone diluent is employed which is both miscible with the silicone hydride and easily stabilized as an emulsion.

Further, a diluent may make mixing of emulsions for a curable composition less sensitive to variations in amounts employed. For instance, very little silicone hydride is necessary to crosslink a vinyl silicone. Mixing small portions of silicone hydride into large portions of vinyl emulsion can easily result in too little or too much silicone hydride being added. By diluting the silicone hydride, a ratio of 1/1 or 1/2 can be employed when mixing reactants which reduces the sensitivity of the composition to blending errors.

The preferred diluent is a vinyl chain-stopped polysiloxane with optional vinyl on chain having the empirical formula:

$$R_e(CH=CH_2-)_f SiO_{(4-e-f)/2}$$

where R is a substituted or unsubstituted hydrocarbon radical of from 1 to 12 carbon atoms; e is 1 to 2; f is 0.005 to 1; e+f is 0.8 to 3; and the polysiloxane has a viscosity of 10 to 10,000,000 centipoise at 25° C. Preferably the vinyl chain-stopped polysiloxane is linear.

The precise nature and amount of silicone diluent employed must necessarily vary with the purpose of the diluent. Generally there should be employed from 1/100 to about 100/1 parts by weight diluent to parts of silicone hydride and hydroxy substituted silicone fluid. Preferably this ratio should vary from about 1/50 to 50/1.

The emulsion can further contain fillers, biostats, wetting agents, pigments, inhibitors, etc. in their art recognized amounts. Biostats are particularly desirable in water emulsions.

The emulsion is blended by simply mixing the ingredients and milling to desired micelle sizes. Persons skilled in the art know various machines and techniques necessary or desirable to form the emulsion. For example, the silicone components may first be blended with a small amount of water and subsequently emulsified into the balance. Smaller micelle sizes aid mass transfer when used and thus milling should continue to obtain the smallest practical diameter. Generally the average oil micelle diamater ranges from about 0.1 to 10 microns. Preferred micelle diameters range from about 0.5 to about 3 microns.

Once formed the emulsion may be blended with an emulsion of vinyl functional silicone and platinum catalyst to form a curable composition. This vinyl silicone emulsion must have a continuous phase of water and in the oil phase a vinyl functional silicone and an effective amount of platinum catalyst, i.e. about 1 to 300 parts per million of the oil phase. The vinyl funtional silicone emulsion may have oil phase to water phase proportions within ranges given above for the silicone hydride emulsions. Generally there should be from 1/5 to 5/1 by weight hydride groups for every vinyl group in a curable composition.

It may be necessary to mill the emulsions upon combining them but if micelle sizes are sufficiently small and the silicone hydride is sufficiently miscible or has been properly diluted milling is not necessary. Of course, it is recognized that an addition reaction will proceed quickly upon mixing the emulsions and an inhibitor such as a malleate or acetylenic inhibitor may be necessary to provide adequate open times.

The examples below are given for the purpose of illustrating the practice of the above invention. They are not given for any purpose of setting limitations and defining the scope of the invention set forth in the specification and claims. All parts are by weight.

EXAMPLES 1-6

The polysiloxane components of Table 1 are mixed with the emulsifier, 10% poly vinyl alcohol in water, at 35° C. until a homogeneous premix is obtained. To this about ⅓ of the distilled water is added at a rate sufficiently slow to prevent inversion and agitation is continued at 35° C. for 30 minutes. The remaining water, wetting agent and biostat are mixed in a separate tank to form a second mixture. The premix is milled and inverted to produce an oil in water emulsion. The inverted premix is added to the second mixture to produce the test emulsion.

300 ml of test emulsion are placed in a 500 ml flask and a simple manometer is attached. The flask is allowed to stand at constant temperature for 24 hours to measure pressure in the flask. Subsequently the compositions were placed in storage containers which were opened after an additional week to check for any build up of pressure.

| Ingredients | |
|---|---|
| Silanol A | silanol end-stopped polydimethylsiloxane, 8.6% —OH |
| Silanol B | silanol end-stopped polydimethylsiloxane, 5.8% —OH |
| Silanol C | silanol end-stopped polydimethylsiloxane, 4.0% —OH |
| Hydrogensiloxane | polydimethyl methylhydrogensiloxane, 30–75 cps at 25° C., 0.72–1.0% —H |
| Vinylsiloxane | vinyl chain-stopped, polydimethylethylvinyl siloxane, 400–500 cps at 25° C., 2% —CH = CH$_2$ |
| Emulsifier | 10% polyvinyl alcohol in water |
| Biostat | 50/50 blend sorbic acid and propyl ester of para-hydroxy benzoic acid |
| wetting agent | octylphenoxy polyethoxy ethanol |

TABLE 1

| Ingredients | 1 | 2 | 3 | 4 | 5 | 6 |
|---|---|---|---|---|---|---|
| Silanol A | — | — | — | — | 2.0 | 4.0 |
| Silanol B | — | 1.0 | 2.0 | — | — | — |
| Silanol C | — | — | — | 3.0 | — | — |
| Hydrogensiloxane | 8.0 | 8.0 | 8.0 | 8.0 | 8.0 | 8.0 |
| Vinylsiloxane | 40.0 | 40.0 | 40.0 | 40.0 | 40.0 | 40.0 |
| Emulsifier | 15.0 | 15.0 | 15.0 | 15.0 | 15.0 | 15.0 |
| Biostat | 0.15 | 0.15 | 0.15 | 0.15 | 0.15 | 0.15 |
| Wetting agent | 0.05 | 0.05 | 0.05 | 0.05 | 0.05 | 0.05 |
| Water | 37.0 | 37.0 | 37.0 | 37.0 | 37.0 | 37.0 |
| —OH, wght % oil phase | 0.0 | 0.116 | 0.232 | 0.24 | 0.346 | 0.692 |
| —H, wght % oil phase | 0.14 | 0.14 | 0.14 | 0.14 | 0.14 | 0.14 |
| Pressure, mm, at 24 hours | 30 | 0 | 0 | 0 | 0 | 0 |
| Pressure with 1 week storage | Yes | Yes | No | No | No | No |

What is claimed is:

1. A curable silicone composition in two packages, the first package comprising a continuous water phase and a discontinuous oil phase comprising:
   (i) a vinyl containing silicone, and
   (ii) from about 1 to 300 ppm platinum catalyst based on the oil phase; and
the second package comprising a continuous water phase and a discontinuous oil phase comprising:
   (a) silicone hydrides containing units of the formula:

$$R_a H_b SiO_{(4-a-b)/2}$$

where a may be 0, 1 or 2; b may be 1 or 2; a+b may be 1, 2 or 3; and R is a substituted or unsubstituted hydrocarbon radical of 1 to 12 carbon atoms; and
   (b) hydroxy substituted silicone containing units of the formula:

$$R_c(OH)_d SiO_{(4-c-d)/2}$$

wherein c is 1, 2 or 3; d is 1 or 2; c+d may be 2, 3, or 4; and R is a substituted or unsubstituted hydrocarbon radical of from 1 to 12 carbon atoms; wherein the viscosity of the hydroxy substituted silicone has a viscosity of from about 10 to 500 centipoise at 25° C.; and wherein the ratio of hydroxy functionality to hydride functionality ranges from about ⅓ to about 17/1.

* * * * *